United States Patent [19]

Nakayama

[11] 4,051,935
[45] Oct. 4, 1977

[54] WORK TOOL

[76] Inventor: Eiji Nakayama, 1140 Yokkamachi, Sanjo, Japan, 955

[21] Appl. No.: 677,136

[22] Filed: Apr. 15, 1976

[30] Foreign Application Priority Data

Apr. 18, 1975 Japan .................. 50-46329

[51] Int. Cl.² ............................................. F16D 41/08
[52] U.S. Cl. ..................................... 192/44; 81/59.1
[58] Field of Search ......................... 192/44; 81/59.1

[56] References Cited

U.S. PATENT DOCUMENTS

| | | | |
|---|---|---|---|
| 2,003,155 | 5/1935 | Pfauser | 192/44 |
| 2,228,888 | 1/1941 | Rock | 192/44 X |
| 2,860,750 | 11/1958 | Avanzati | 192/44 |
| 3,362,267 | 1/1968 | Rozhus | 192/44 X |
| 3,908,487 | 9/1975 | Plaw | 192/44 X |

Primary Examiner—Allan D. Hermann
Attorney, Agent, or Firm—John E. Reilly

[57] ABSTRACT

A torque-applying hand tool includes a stepless mechanism for turning an object in a desired direction through an unlimited range by swinging the handle thereof. The stepless mechanism comprises a polygonal shaft and rollers each being placed in touch with each side of the polygon shaft. Each roller is selectively forced to one end or the other of each side so that the polygon shaft may be turned in one direction when the tool handle is turned. At one end of the polygon shaft is formed a socket or box shaft to engage with the object to be turned. In such a tool, the stepless mechanism can be made compact with an unlimited turning range of the object.

7 Claims, 9 Drawing Figures

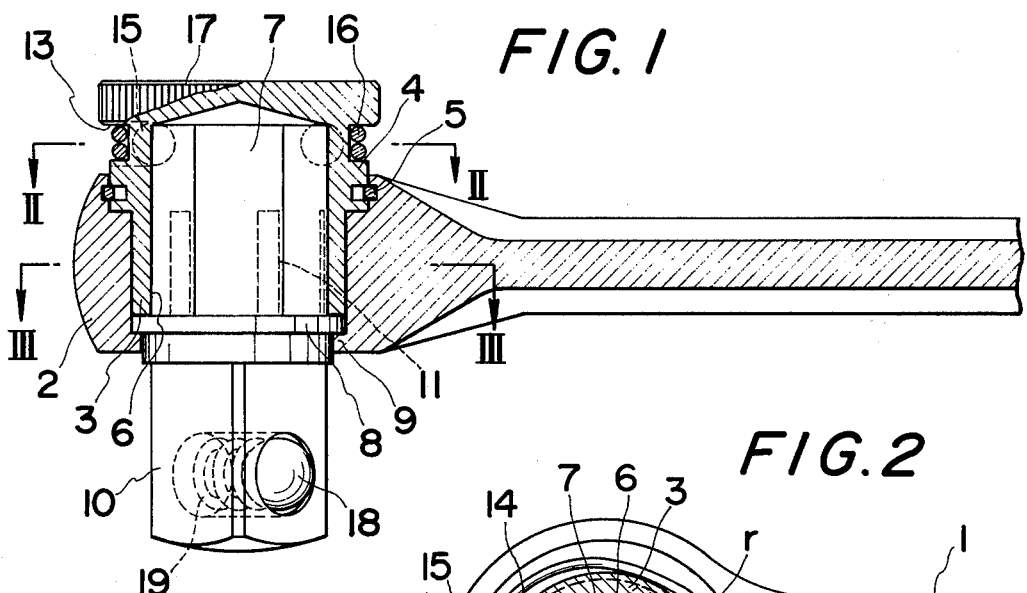
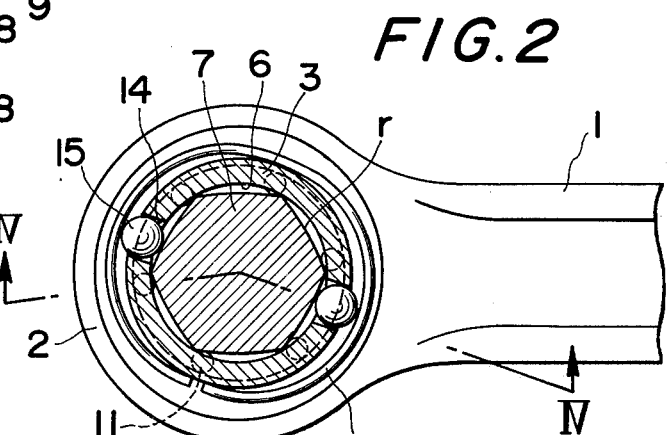

WORK TOOL

The present invention relates to novel and improved tools, and more particularly relates to hand tools that work in the manner of a ratchet wrench through the use of a stepless mechanism in place of a ratchet mechanism.

BACKGROUND OF THE INVENTION

In prior art ratchet tools, customarily an externally toothed head ring is turned in one direction by a ratchet pawl being engaged therewith. Therefore, when the number of teeth is increased to expand the working capacity, the head ratchet mechanism must be enlarged. However, from the standpoint of practical use, enlargement of the head ratchet mechanism is physically limited.

SUMMARY OF THE INVENTION

An object of the present invention is therefore to provide a novel and improved tool that has a small-sized head for convenience of handling and offers freely adjustable working capacity for reversibly turning an object in either desired direction.

In accordance with the present invention, a working tool has been devised which specifically operates very much in the manner of a ratchet-like wrench wherein the head portion of the tool has an annular cylinder disposed in the head portion with an upper knob member to permit selective reversal of the rotational direction of applying a force by the tool, for instance, in loosening or tightening a threaded member. The annular cylinder or ring has a plurality of axially extending slots equally spaced around its circumference, and at least one opening is provided at the upper portion of the cylinder to contain a spring-loaded ball to normally urge the ball inwardly into abutting relation to a polygonal shaft which is housed in the cylinder. Rollers are disposed in the axially extending slots between the cylinder and shaft, the diameter of each roller being greater than the thickness of the cylinder and the number of rollers corresponding to the number of external surfaces or sides of the polygonal shaft. Depending upon the initial disposition of the spring loaded balls with respect to the polygonal shaft, the rollers are lockingly disposed with respect to the external sides of the shaft in order to impart a torque or turning force to the shaft only in one direction of rotation while permitting the tool handle to be freely rotatable with respect to the shaft in the opposite direction.

The above and other features and advantages of the present invention may be gained from the following description of alternate forms of the present invention when taken together with the accompanying drawings in which:

BRIEF DESCRIPTION OF THE DRAWINGS

FIG. 1 is a side elevation view, in section, of a tool embodying the present invention;

FIG. 2 is a fragmentary sectional plan view along the line II — II in FIG. 1;

FIG. 3 is a fragmentary sectional plan view along the line III — III in FIG. 1;

FIG. 4 is a sectional side elevation along the line IV — IV in FIG. 2;

DETAILED DESCRIPTION OF ALTERNATE EMBODIMENTS

Figure 5:
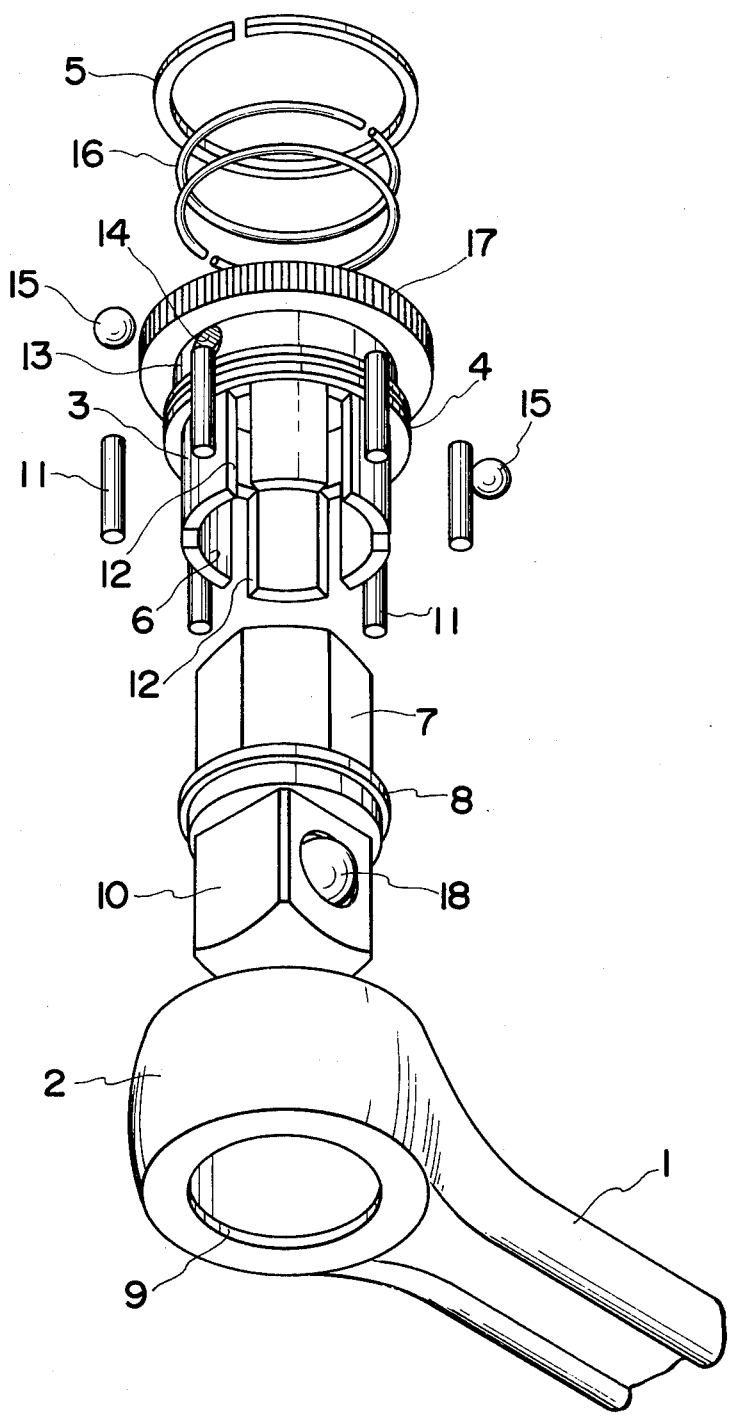
FIG. 5 is an exploded perspective view.

Reference is now made to FIG. 1 which illustrates one embodiment of the present invention. A tool handle 1 has a head portion 2 wherein a central bore is formed therein. An annular cylinder or ring 3 is inserted into the bore of the head portion 2 and rotatably secured by engagement of an externally stepped portion 4 of the cylinder 3 with a snap ring 5 in order to avoid withdrawal. In a bore 6 of the cylinder 3, a hexagon shaft 7 having sides externally rounded with a large radius at their adjoining edges is inserted. At the bottom of the hexagon shaft 7 is provided a stepped portion 8 which is enmeshed with a groove 9 positioned at the bottom of the bore of the head portion. A socket shaft 10 is integral with a lower portion of the hexagonal shaft 7 for insertion in a socket end wrench or the like. Steel rollers 11 each having a diameter slightly larger than the thickness of the cylinder 3 are rotatably incorporated into six axial slots or slits 12 at equally spaced circumferential intervals in the cylinder 3. At the upper portion of the cylinder 3 is a square groove 13 from which one or more small openings 14 pass through the cylinder 3 at an angle of 30° to the slots 12, as shown in FIGS. 2 and 5. In each small opening 14, a steel ball 15 having a diameter larger than the wall thickness of the cylinder 3 is rotatably contained and pressed inwardly by the force of springs 16 wound in the square groove 13. A knob 17 is integrally constructed with the cylinder 3 at the top end thereof and used for switching or reversing of the rotational direction. A stop ball 18 is embedded into the socket shaft 10 by means of a spring coil 19 so as to be capable of being depressed or projected, but not being removed.

For the purpose of illustration and not limitation, reference is made to dimensions of important parts: The distance between the opposite sides of the hexagon shaft is 13 mm, height of the externally curved portion of each side is 0.15 mm, the roller diameter contained in the slit is 2 mm, and clearance for smooth travel of the roller is 0.2 mm. Therefore, the inside diameter of the head portion 2 becomes 13.00 + 0.30 + 4.00 + 0.40 = 17.70 mm.

In order to ensure positive, smooth travel of the rollers 11 from one end to another of the sides of the hexagon shaft 7, it is required that the radius of each side of the shaft 7 be larger than the inside radius of the cylinder 3; i.e., the radial distance of the curved edges adjoining the sides from the center of the shaft is greater than the radial distance of the inner surface of the cylinder from the center of the shaft.

Figure 7:
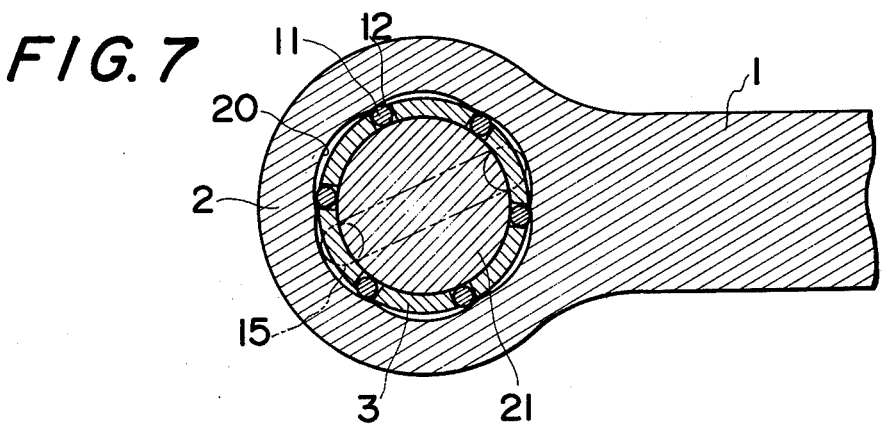
FIG. 7 is a sectional plan view showing another embodiment of the invention.

Referring now to FIG. 7, another embodiment of the present invention will be described. In this case, the above-mentioned arrangement is reversed. In the foregoing arrangement, the rollers travel along the sides of the hexagon shaft centered in the head portion 2. Conversely, in this arrangement, the rollers move along curved grooves 20 which are equally spaced around and encaved in the bore surface of the head portion 2 wherein the cylinder 3 is inserted. In this case, a shaft 21 is contained in the cylinder 3 to support the steel rollers and a spring is press-fit between the opposite steel balls.

Moreover, instead of the foregoing hexagon shaft, polygonal shafts such as pentagonal, heptagonal or octagonal may be employed. When such a polygonal shaft is used, the number of slots and rollers is changed according to the number of sides of the polygonal shaft employed. In FIG. 7, the number of encaved grooves is also changed as well as the above case.

Hereinafter, operation of the embodiment of the present invention will be described: Like a conventional ratchet handle, after adapting a wrench socket to the socket shaft 10, this tool serves to rotate an object in one intended direction by swinging the tool handle 1 in both directions.

Figure 6A:
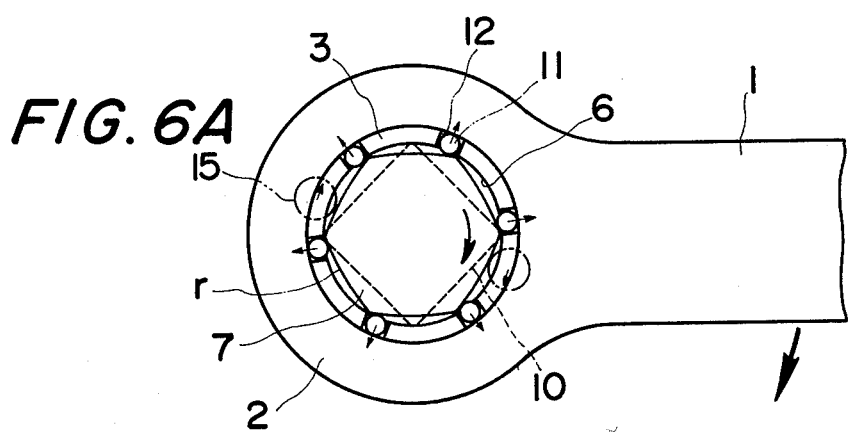
FIG. 6 (a), (b) and (c) are plan views showing operating conditions.
Figure 6B:
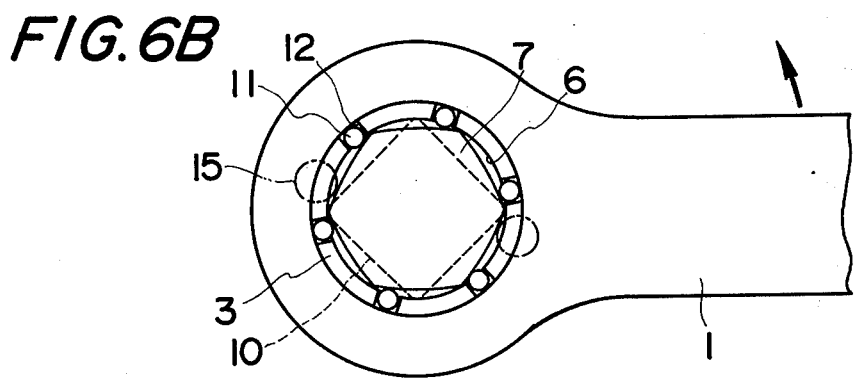
Figure 6C:
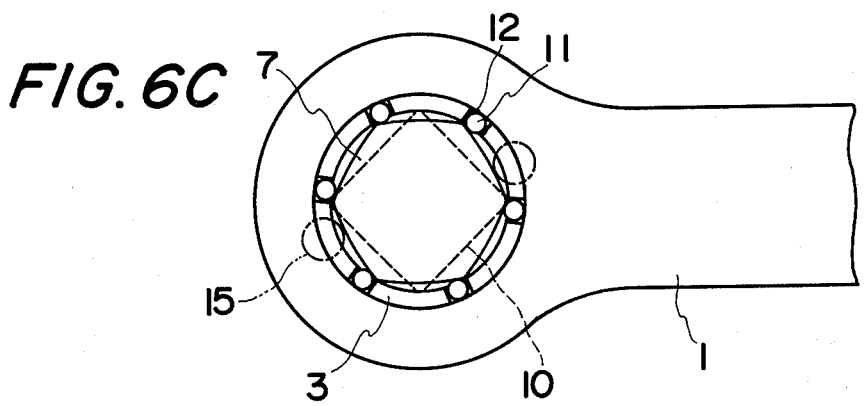

First, to select the rotational direction, the knob 17 which is integral with the cylinder 3 is turned 60° (one pitch) in the direction similar to that of the object to be rotated. Secondly, the operating principle of the tool of the present invention will be explained with reference to FIG. 6. FIGS. 6 (a) and (b) illustrate operational conditions when the object is rotated in a clockwise direction. Since the steel balls 15 built into the cylinder 3 are forced inwardly by the spring 16, the steel balls 15 are forced to move along the sides of the hexagonal shaft 7 in a direction to a point having a minimum distance from the center of the hexagon shaft 7; or in other words will tend to center themselves with respect to each side of the shaft. As a result, the rollers 11 contained in the slots 12 of the cylinder 3 each is forced to shift to the extreme right end of the space formed by the cylinder bore 6 and the side of the hexagonal shaft 7. Thus, when the tool handle 1 is pulled or turned in a clockwise direction, the rollers 11 and the cylinder 3 are rotated in the same direction to the possible right end of the space formed by the cylinder bore 6 and the side of the hexagonal shaft 7. Accordingly, the rollers 11 are locked at the right end of the space due to increased friction with the bore surface of the head portion 2, and the hexagonal shaft 7 is thereby rotated with the handle movement in a clockwise rotation. On the contrary, when the tool handle 1 is returned in counterclockwise direction to the original position as shown in FIG. 6 (b), the rollers 11 are also released from the locking on the right side due to frictional engagement with the bore surface of the head portion 2 and to clockwise-rotational force of the cylinder 3 caused by the spring-loaded steel balls 15. As a result, the tool handle 1 may be freely returned. Obviously, the hexagonal shaft remains in the same position independently of the counterclockwise rotation of the tool handle 1. When the counterclockwise rotation of the tool handle 1 stops, the steel balls 15 are forced to return toward the right end by the force of spring 16. Accordingly, the cylinder 3 is again rotated in the clockwise direction and the rollers 11 are in turn locked at the right end of the space formed by the cylinder bore 6 and the hexagon shaft 7. According to the above-mentioned operating principle, when the tool handle 1 is pulled in a clockwise direction, the socket shaft 10 is turned with the tool handle 1, while when pulled in counterclockwise direction, the socket shaft 10 remains in the same position so that the object to be rotated may be turned in only one direction. FIG. 6 (c) shows the operating state of the tool when the object is rotated in counterclockwise direction. When the knob 17 is rotated at an angle of 60° in counterclockwise direction, the steel balls 15 each travel over one edge of the hexagon shaft 7 to an adjacent left-hand side. Under this state, the steel ball 15 is positioned at midpoint between two steel rollers 11. In other words, the steel ball 15 is placed at an angle of 30° to the adjacent steel rollers 11. As a result of the rotation of the cylinder 3 with the steel balls 15, the steel rollers 11 are forced to rotate in a counterclockwise direction and locked at the most extreme left-hand end of the space formed by the hexagon shaft 7 and the cylinder bore 6. Contrary to FIGS. 6 (a) and (b), when the tool handle 1 is pulled in a counterclockwise direction, the hexagonal shaft 7 is rotated in the same direction, while when pulled in the reverse direction, the hexagonal shaft 7 remains in the same position.

The present invention is not limited to the hexagonal shaft as mentioned earlier. The shaft can be shaped in other polygons such as pentagon, heptagon and octagon. In such cases, the number of slots and rollers must be changed according to a polygon employed, but the operating function of the tool of the present invention is unchanged.

As described earlier, the tool of the present invention serves as a hand wrench without the need for conventional stepped ratchet mechanisms. In other words, the tool of the present invention is stepless mechanism hand wrench having an unlimited rotation range from zero to any arbitrary angle and therefore differs from the prior art stepped mechanism handle and wrench. The tool of the present invention provides an unlimited working capacity in tightening or loosening the object. Furthermore, the small-sized head portion of the tool of the present invention is lightweight but rugged enough to avoid any breakage. A further advantage of the present invention is its low manufacturing cost.

It is therefore to be understood from the foregoing description of alternate forms of the present invention that various modifications and changes may be made in the specific construction and arrangement of parts without departing from the spirit and scope of the present invention as defined by the appended claims.

What is claimed is:

1. A tool for turning an object comprising: a tool handle having a head portion; a hollow cylinder encased in said head portion having a knob for switching rotational directions, a plurality of axial slots equally spaced around the circumference of said cylinder and having one or more openings provided at the upper portion thereof; a shaft of polygonal shape housed in said cylinder; rollers contained in said slots, said roller diameter being larger than the thickness of said cylinder and the number of said rollers and slots being similar to that of sides of said polygon; one or more steel balls contained in said one or more openings, said steel ball diameter being larger than the thickness of said cylinder and located between said rollers; resilient means inwardly pressing said steel balls to abut the sides of said polygonal shaft whereby said rollers travel along the sides of said polygonal shaft and each is locked at either extreme end of travel so that said polygonal shaft may be turned in one direction when said tool handle is swung in one direction and said shaft will not turn when said tool handle is swung in the opposite direction.

2. A tool according to claim 1 in which the sides of said polygonal shaft are curved with a radius larger than an inside radius of said cylinder.

3. A tool according to claim 1 in which the sides of said polygonal shaft have adjoining edges curved at a radial distance away from the center of said shaft larger than the inside radius of said cylinder.

4. A hand wrench for turning an object comprising: a tool handle having a head portion; an annular cylinder encased in said head portion having a knob member for reversing rotational direction of said wrench, a plurality of axial slots equally spaced around the circumference of said cylinder and at least one opening provided at the upper portion of said cylinder; a polygonal shaft housed in said cylinder; rollers contained in said slots, the diameter of each roller being larger than the thickness of said cylinder and the number of said rollers and slots corresponding to that of the sides of said polygon; a steel ball contained in each opening, said steel ball diameter being larger than the thickness of said cylinder and located between said rollers; outer circumferential springs inwardly pressing said steel balls to abut the sides of said polygonal shaft whereby said rollers travel along the sides of said polygon shaft and each is locked at either extreme end of travel so that said polygonal shaft may be turned in one direction when said handle is swung in one direction and said shaft will not turn when said handle is swung in the opposite direction.

5. A wrench comprising a handle having a head portion provided with a central bore therein, a torque-applying member disposed in inner spaced concentric relation to said head portion; the space between the inner surface of said head portion and the external surface of said torque-applying member defining a series of cavities at equally spaced circumferential intervals, each cavity being wider at the center than at the ends and converging from the center in opposite circumferential directions toward the ends; roller drive means including a roller disposed for rotation in a circumferential direction in each cavity, each roller diameter being less than the width of the cavity at its center and greater than the width of the cavity at its ends, the number of said rollers corresponding to the number of cavities, spring-loaded centering means interposed between said rollers including at least one steel ball larger in diameter than the width of said cavity and at least one spring pressing said steel ball to abut the sides of said cavity, said spring-loaded centering means operative to yieldingly urge said rollers toward one end of each respective cavity whereby to impart rotation to said torque-applying member when said handle is turned in one direction and to rotate within each cavity independently of said torque-applying member when said handle is turned in the opposite direction.

6. A wrench according to claim 5, said torque-applying member including means cooperative with said centering means for reversing rotational direction of the rotation of said torque-applying member.

7. A wrench according to claim 5 in which the sides of said cavity have adjoining edges curved at a radial distance away from the center of said torque-applying member.

* * * * *